Oct. 13, 1970    B. ROHRBACH    3,533,584
SHEET MATERIAL BLANKS FOR ASSEMBLING DISPLAY
DEVICES AND THE LIKE
Filed Aug. 19, 1968    4 Sheets-Sheet 1

Inventor:
BERND ROHRBACH
By Kurt Kelman
AGENT

Oct. 13, 1970  B. ROHRBACH  3,533,584
SHEET MATERIAL BLANKS FOR ASSEMBLING DISPLAY
DEVICES AND THE LIKE
Filed Aug. 19, 1968  4 Sheets-Sheet 3

Inventor:
BERND ROHRBACH
BY Kurt Kelman
AGENT

Oct. 13, 1970   B. ROHRBACH   3,533,584
SHEET MATERIAL BLANKS FOR ASSEMBLING DISPLAY
DEVICES AND THE LIKE

Filed Aug. 19, 1968   4 Sheets-Sheet 4

United States Patent Office 3,533,584
Patented Oct. 13, 1970

3,533,584
SHEET MATERIAL BLANKS FOR ASSEMBLING
DISPLAY DEVICES AND THE LIKE
Bernd Rohrbach, Kettenhofweg 80,
Frankfurt am Main, Germany
Filed Aug. 19, 1968, Ser. No. 753,479
Claims priority, application Germany, Aug. 19, 1967,
1,561,598; Apr. 19, 1968, 1,761,216
Int. Cl. A47f 5/11
U.S. Cl. 248—174                                          10 Claims

ABSTRACT OF THE DISCLOSURE

A set of sheet material blanks partly having fold lines, and all having notched edges which can be assembled in display devices and the like. A panel blank in the set has four parallel fold lines to separate two pairs of narrow, long edge portions from each other and from a major central portion. The outer edge portions have two notches in their respective free edges. Two column blanks are each elongated and have one notch in each short transverse edge. The dimensions of the panel and column blanks are such that they may be interengaged in a position in which the bottoms of the notches in the panel blank abuttingly engage the bottoms of associated notches in the column blanks.

BACKGROUND OF THE INVENTION

This invention relates to flat sheet material blanks which may be folded and interengaged to form three-dimensional structures, and particularly to a set of blanks suitable for assembling display devices for merchandise or publicity messages, and the like.

An object of the invention is the provision of blanks capable of being stored and shipped in little space, yet capable of being assembled into devices having substantially greater bulk than the stored blanks.

Another object is the provision of a set of blanks which may be combined in a multiplicity of patterns to produce a wide variety of three-dimensional devices from a small number of blank types.

A further object is the provision of display devices and the like which have relatively great load carrying capacity and are stable.

SUMMARY OF THE INVENTION

With these and other objects in view, as will hereinafter become apparent, there is provided a set of sheet material blanks which includes at least one panel blank and two column blanks. The panel blank has two opposite edges and two pairs of edge portions, each pair being adjacent an associated edge, and the members of the pair being elongated in the direction of the associated edge. The remainder of the panel blank constitutes a central major portion of greater area than any one of the strip portions. The several portions of the panel blank define four fold lines which separate the edge portions of each pair, and one of the members of each pair from the central portion. The other member of the pair provides the afore-mentioned associated edge and is formed with two spaced, transverse notches in the edge.

Each column blank is elongated and has two edges transverse of the direction of elongation and formed with respective notches therein. The column blanks are dimensioned for interengagement with the panel blank in a position in which the bottoms of the two notches in each colum blank abuttingly engage the bottoms of respective notches in the panel blank.

The set may further comprise an elongated connecting blank having two longitudinal edges each formed with two spaced, transverse notches, the spacing of the last-mentioned notches being the same as the spacing of the notches in the edges of the panel blank.

Other features, additional objects, and many of the attendant advantages of this invention will be more fully understood by reference to the following detailed description of preferred embodiments when considered in connection with the attached drawing.

DESCRIPTION OF THE PREFERRED EMBODIMENTS

Figure 1:
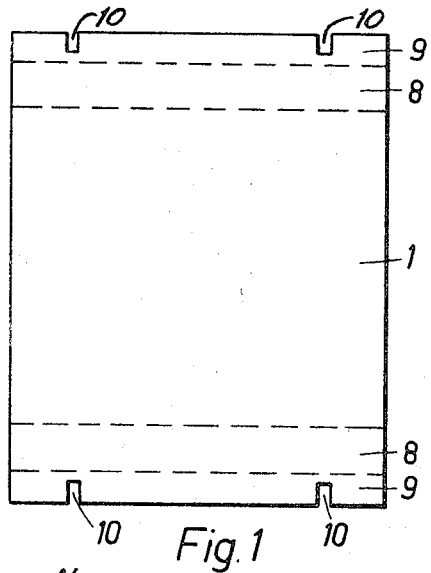
FIG. 1 shows a blank for a basic folded panel of the invention in plan view.

The panel blank seen in FIG. 1, and also in FIGS. 2, 3, 15, 16, and 17 is a generally rectangular piece of at least moderately rigid sheet material, such as cardboard, in which two pairs of narrow, elongated strip portions 8, 9 paralell to and adjacent the narrow edges of the blank are separated from the almost square major central portion of the blank by fold lines defined by creases or perforations which facilitate bending of the sheet material. The two outermost strip portions 9 have each two spaced notches 10 in their exposed longitudinal edges.

Figure 2:
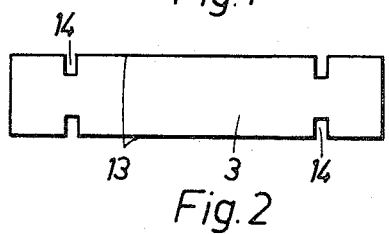
FIG. 2 shows a blank for a flat connecting member.

A second basic element of the invention shown in FIG. 2 is a flat connecting member 3 cut from the same sheet material as the panel blank of FIG. 1 and having a narrow rectangular shape. The two long edges 13 of the connecting member 3 are equal in length to the short edges of the panel 1 and are each provided with two notches 14 identical in shape and spacing with the notches 10.

Figure 3:
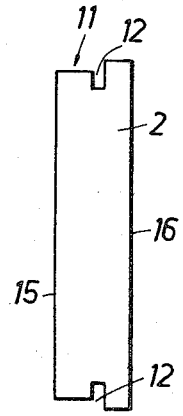
FIG. 3 shows a blank capable of serving as a flat upright column.

The flat blank 2 seen in FIG. 3 is mainly intended at an upright column or load-bearing member in display devices of the invention. It is a relatively narrow strip having parallel longitudinal edges 15, 16 of slightly different length. The transverse edges 11 of the blank 2 have each two portions at right angles to the corresponding longitudinal edges 15, 16 and therefore longitudinally offset, which are separated by a notch 12. The blank 2 is shorter than the blank 1 and equal in width to the blank 3.

The difference in the lengths of the edges 15, 16 is equal to twice the thickness of the sheet material, and the width of the rectangular notches 10, 12, 14 meets the same requirement.

Figure 15:
FIG. 15 illustrates yet another blank in plan view, the blank being suitable for use as a connecting member or as an upright column.

FIG. 15 shows a blank 17 similar to the blank 3 but additionally provided with notches in its longitudinal edges analogous to the notches 14 in FIG. 2. The blank seen in FIG. 15 may be used to replace either the connecting member 3 or the column 2.

Figure 4:
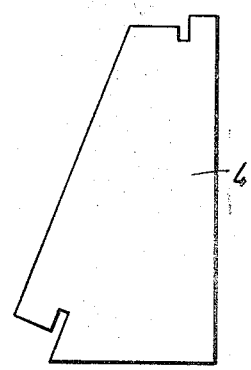
FIGS. 4, 5, 6, and 7 show modifications of the blank of FIG. 3.

FIGS. 4 to 7 illustrate modifications of the column blank of FIG. 3. The blank 4 of FIG. 4 is derived from the shape seen in FIG. 3 by moving the two ends of the edge 15 away from the edge 16 over different distances so that the other longitudinal edge is perpendicular to the adjacent portions of the transverse edges and to the remote portion of the shorter transverse edge so obtained, whereas the other longitudinal edge is obliquely inclined to the first-named longitudinal edge and perpendicular to the adjacent portion of the longer transverse edge. The notch in the latter is parallel to the obliquely inclined longitudinal edge.

Figures 5, 6:
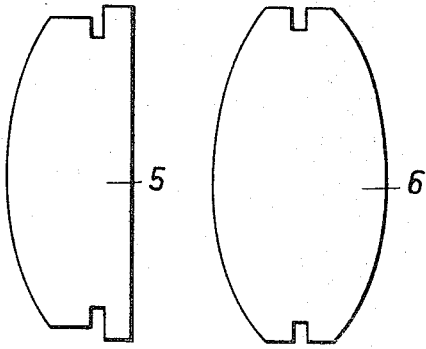

The column blank 5 of FIG. 5 differs from that of FIG. 3 by a shorter longitudinal edge which bulges outward in an approximately circular convex arc. The blank 6 of FIG. 6 has two convexly and approximately circularly arcuate, longitudinal edges which connect transverse edges having each two portions separated by a notch as in FIG. 3, but extending in a common line perpendicular to the direction of elongation of the blank.

Figures 7, 8:
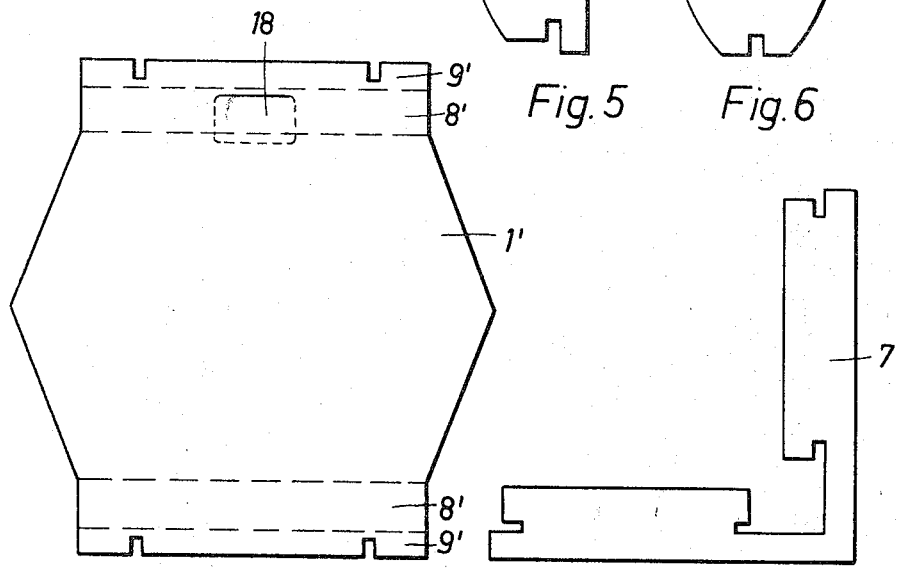
FIG. 8 illustrates a modification of the basic panel blank of FIG. 1.

The column blank 7 shown in FIG. 7 essentially consists of two column blanks of the type shown in FIG. 3 elongated at right angles to each other and integrally connected by an L-shaped bridge whose legs are each bounded by extensions of the longer longitudinal edge and of the adjacent wall of the notch in the transverse edge of the associated column portion, the arrangement being such that the remainders of the two transverse edges near the bridge bound a recess between the constituent blank portions at the apex of the L-shape.

FIG. 8 shows a modification 1' of the basic panel blank of FIG. 1 derived from the latter by pulling the centers of the longitudinal edges away from each other while maintaining the configuration of the strip portions 8', 9'. The blank of FIG. 8 therefore differs from that of FIG. 1 by longitudinal edge portions which bulge outward in symmetrical V-shapes from the major central portion. A U-shaped slot 18, partly formed by spaced perforations, permits a flap to be bent out of the plane of the major central portion of the blank 1' to provide a retaining bracket for displayed merchandise.

Figure 9:
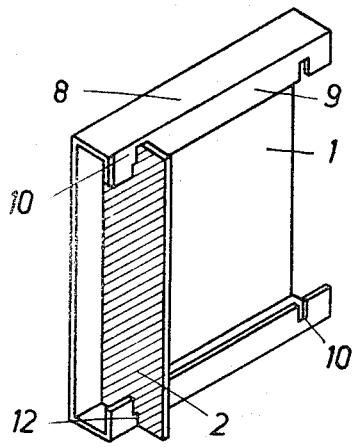
FIG. 9 shows the basic panel blank of FIG. 1 assembled with the column of FIG. 3 in a perspective view.

FIG. 9 shows a partly assembled display device of the invention which will ultimately consist of one panel blank 1 and two column blanks 2. The strip portions 9 of the panel blank 1 are bent at right angles to the central portion of the panel 1 along the fold lines to form a flat U-channel, and the strip portions 9 are bent toward each other in a common plane to constitute inturned flanges in the channel. Two columns 2 will ultimately be assembled with the panel 1 in a manner only partly shown in FIG. 9 by interengagement of the notched parts of the blanks 1, 2. The bottoms of the notches 10, 12 abuttingly engage each other. The short longitudinal edge of the column 2 is received in the channel of the blank 1, and abuttingly engages the major central portion of the blank 1 over the entire length thereof, and the parts of the narrow transverse edges adjacent the longer longitudinal edge portion of the blank 2 are flush with the outer faces of the strip portions 8.

The display device partly seen in FIG. 9 may thus be stood on edge, as seen in the drawing, but it may also be set down on the exposed longitudinal edges of the blanks 2 to provide a horizontal carrier surface for displayed goods formed by the central portion of the blank 1.

Figure 10:
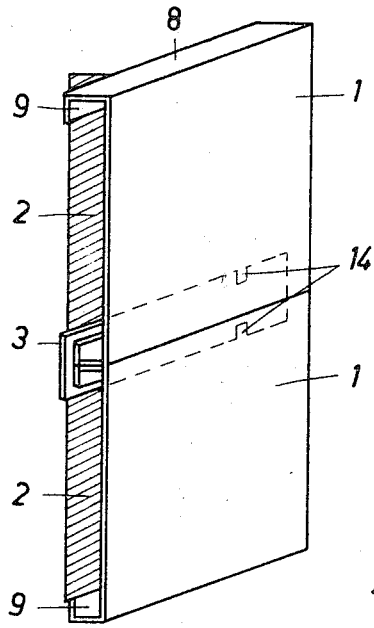
FIG. 10 illustrates a display assembly made from two blanks of FIG. 1 and blanks of FIGS. 2 and 3 in a perspective view.

The display device shown in FIG. 10 consists of two juxtaposed units of the type shown in FIG. 9 in partially assembled condition. The units are connected with each other by a connecting member 3 whose notches 14 are superimposed on the notches 10 in two respective strip portions 9 of the two units which are placed side by side in a common plane in the assembly, a column blank 2 engaging both notches to hold the two units together.

Figure 11:
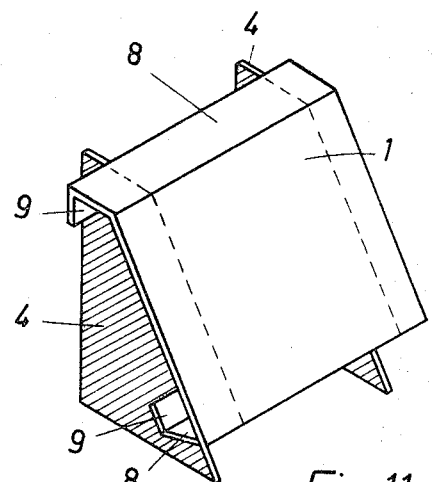
FIG. 11 shows the basic panel blank of FIG. 1 assembled with upright columns made from blanks of FIG. 4.

The display device illustrated in FIG. 11 is obtained in a manner obvious from the preceding description of FIG. 9 by assembling the panel blank 1 with two modified column blanks 4.

Figure 12:
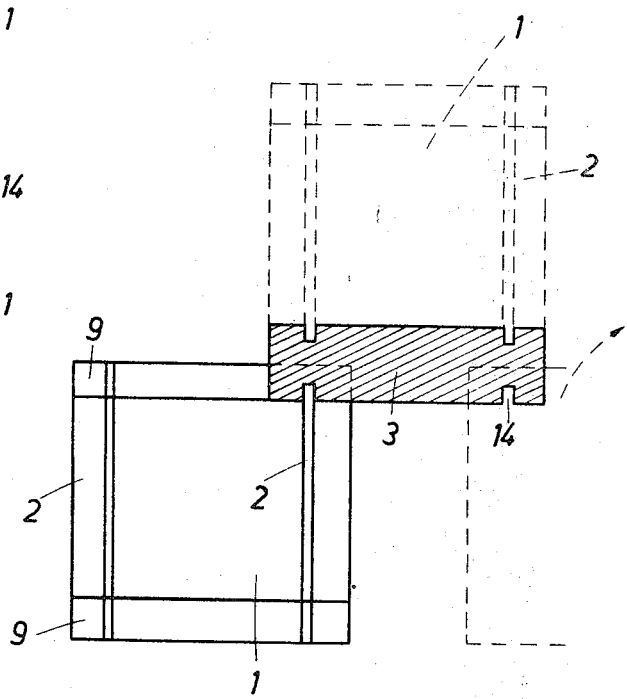
FIG. 12 illustrates the manner in which several basic panel blanks of FIG. 1 may be connected by blanks of FIGS. 2 and 3.

Display devices of the type shown in FIG. 9 may be connected in a checkerboard pattern as is seen in FIG. 12, the assembly method being similar to that described with reference to FIG. 10. A connecting member 3 is partly superimposed on the strip portion 9 of one blank 1 folded as shown in FIG. 9, and attached by means of two associated column blanks 2. The notches 14 in the exposed longitudinal edge of the connecting blank 3 are then respectively superimposed on notches in strip portions 9 of two spaced panel blanks 1 and the connecting blank 3 is attached to the two last-mentioned panel blanks 1 by respective column blanks 2 as is seen in FIG. 12. The procedure may be repeated in an analogous manner to connect as many blanks 1 as desired in such a manner that their major central portions extend in a common plane.

Figure 13:
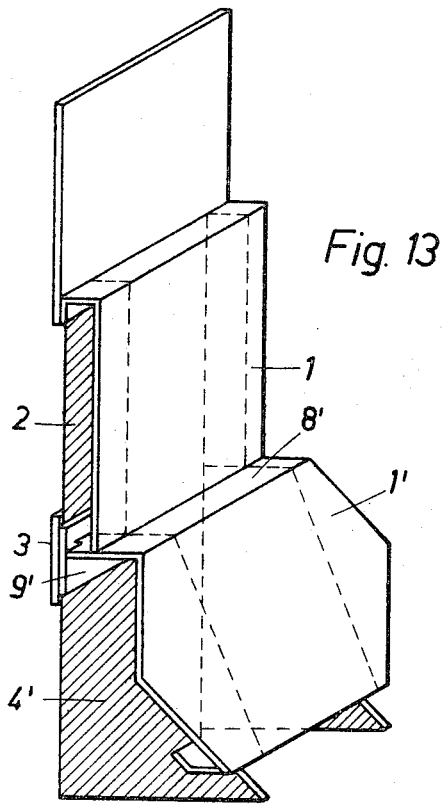
FIG. 13 is a perspective view of a display device assembled from panels of the general type shown in FIGS. 1 to 8.

The technique described with reference to FIG. 10 may also be employed to combine a unit as shown in FIG. 9 with a unit of the type seen in FIG. 11 to produce the display device shown in FIG. 13 in which the unit of FIG. 9 is superimposed on a modified unit of FIG. 11, and a supplemental panel extends upward from the upper unit. The supplemental panel is a marginally slotted rectangular piece of sheet material inserted in the slots of the upright column blanks 2, and thereby attached to the blank 1 which forms the vertical front face of the upper unit. The two column blanks 4' shown in FIG. 13 differ in minor dimensional features from the blank 4 seen in FIG. 4, and the blank 1' is correspondingly modified.

Figure 14:
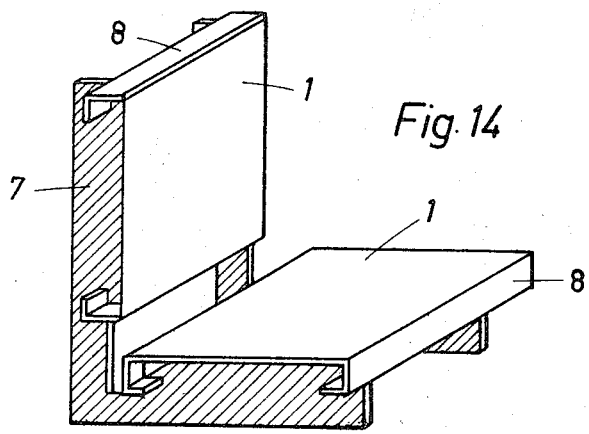
FIG. 14 shows a combination of basic panels according to FIG. 1 with columns according to FIG. 7 in a perspective view.

FIG. 14 shows a display unit of the invention in which two blanks 1 are connected respectively with the two legs of blanks 7 of the type shown in FIG. 14 in a manner obvious from the description of FIG. 9.

Figure 16:
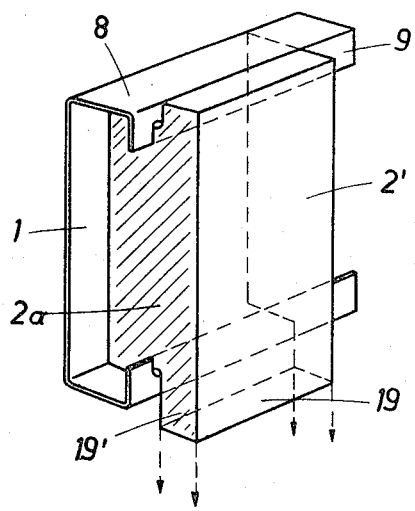
FIG. 16 is a perspective rear view of a display device assembled from a blank of FIG. 1 and a modified column member in the manner of FIG. 9.
Figure 17:
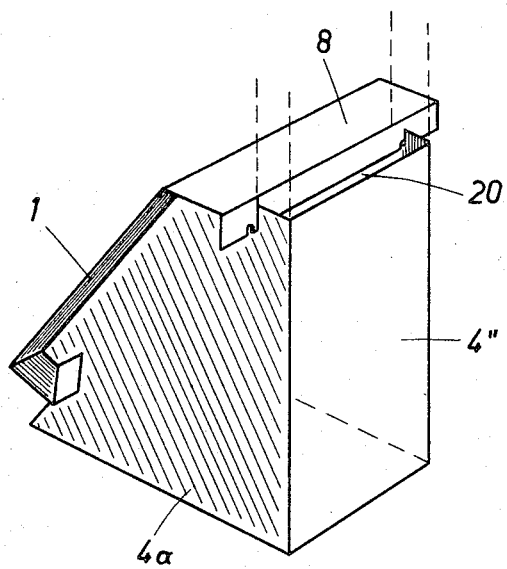
FIG. 17 is a similar view of a modification of the device of FIG. 11.

The device shown in FIG. 16 differs from that illustrated in FIG. 9 by its column assembly 2a which includes two column parts substantially identical with the column blanks 2 seen in FIG. 2 and engaged with a panel blank 1 in a manner obvious from FIG. 9. The column parts 2 are integrally connected by a web 2' from which they are separated by creases or fold lines. Integral flat extensions 19, 19' of the web 2' and of the column portions project downward beyond the lower strip portion 8 of the panel 1 for simple assembly with the device seen in FIG. 17.

The latter differs from that described above with reference to FIG. 11 by a column assembly 4a having two column parts practically identical with the blanks 4 seen in FIGS. 4 and 11, and connected by an integral web 4". The exposed top edges of the column parts and of the web 4" together with the upper strip portions of the associated panel blank 1 define a slot 20. The widths of the webs 2', 4" are chosen in such a manner that the extensions 19, 19' may be inserted into the slot 20.

The modifications achieved in the display devices of FIGS. 9 to 13, 16, 17 by replacing the column blanks 2 or 4 by the blanks illustrated in FIGS. 5 and 6 are too obvious to require explicit illustration and description. The resulting devices have panels whose principal faces are curved approximately cylindrically. The elements 2 and 3, wherever shown, may be replaced by the combined element 17 illustrated in FIG. 15 whose slots provide the functions of connecting members and of column members.

A set for building the display devices of the invention without tools by simply interengaging slotted edges of the blanks may thus consist only of panel blanks, such as those shown in FIG. 1, and combination blanks of the type seen in FIG. 15.

What is claimed is:

1. A set of sheet material blanks including at least one panel blank and two column blanks,
   (a) said panel blank having
      (1) two opposite edges and two pairs of edge portions, said pairs being respectively adjacent said edges, and the members of each pair being elongated in the direction of the associated edge,
      (2) a central major portion,
      (3) means defining four fold lines separating said major portion and said edge portions from each other for facilitating bending of said panel blanks at said fold lines toward and away from a position in which said panel blank is flat,
         (i) one fold line separating the edge portions of each pair,
         (ii) another fold line separating one edge portion of each pair from said central portion,
         (iii) the other edge portion of the pair constituting said edge and being formed with two spaced notches in said edge, said notches having respective bottoms; and
   (b) each column blank being elongated and having two longitudinal edges and two edges transverse of the direction of elongation thereof, said column blank being formed with a notch in each of said transverse edges spaced from said longitudinal edges, said column blank being dimensioned for interengagement with said panel blank in a position in which the bottoms of the two notches in said column blank abuttingly engage the bottom of respective notches in said panel blank.

2. A set as set forth in claim 1, further comprising an elongated connecting blank, said connecting blank having two longitudinal edges each formed with two spaced transverse notches, the spacing of the notches in said connecting blank being the same as the spacing of the notches in said edges of the panel blank.

3. A set as set forth in claim 1, wherein said column blank has two longitudinal edges connected by said transverse edges, said longitudinal edges being of different length, and one of said transverse edges having two longitudinal portions perpendicular to the adjacent longitudinal edge and longitudinally offset from each other.

4. A set as set forth in claim 1, wherein said column blank has two longitudinal edges connected by said transverse edges and obliquely inclined relative to each other.

5. A set as set forth in claim 1, wherein said column blank has two longitudinal edges connected by said transverse edges, one of said longitudinal edges being arcuate.

6. A set as set forth in claim 1, including a column assembly of said sheet material including two column portions respectively constituted by said column blanks and a web portion integrally connecting said column portions, said web portion and said column portions respectively defining two fold lines therebetween, said fold lines extending in a common direction and being spaced transversely of said direction.

7. A set as set forth in claim 6, wherein the length of said column portions is greater than the length of said major portion of the panel blank between the fold lines separating said major portion from the adjacent strip portions of said panel blank.

8. A set as set forth in claim 1, wherein the width of each of said notches is approximately twice the thickness of said sheet material.

9. A set as set forth in claim 1, wherein each of said notches is substantially rectangular and elongated transversely of the associated edge.

10. A set as set forth in claim 1, wherein said column blank is flat.

References Cited

UNITED STATES PATENTS

| 1,301,797 | 4/1919 | Ziegler | 248—174 |
|---|---|---|---|
| 1,886,532 | 11/1932 | Davidson | 248—174 |
| 2,630,641 | 3/1953 | Hessdoerfer | 248—459 |
| 3,341,162 | 9/1967 | Ruchlis | 248—174 |

FOREIGN PATENTS 500,110  1/1951  Belgium.

MARION PARSONS, JR., Primary Examiner

U.S. Cl. X.R.

211—135